US009150175B1

(12) United States Patent
Farooq et al.

(10) Patent No.: US 9,150,175 B1
(45) Date of Patent: Oct. 6, 2015

(54) VEHICLE FRONT END AIRBAG ASSEMBLY AND SYSTEM

(71) Applicant: Ford Global Technologies, LLC, Dearborn, MI (US)

(72) Inventors: Iskander Farooq, Novi, MI (US); Mohammed Omar Faruque, Ann Arbor, MI (US); Manoharprasad K. Rao, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/489,682

(22) Filed: Sep. 18, 2014

(51) Int. Cl.
*B60R 21/00* (2006.01)
*B60R 21/34* (2011.01)

(52) U.S. Cl.
CPC ................. *B60R 21/00* (2013.01); *B60R 21/34* (2013.01); *B60R 2021/0004* (2013.01); *B60R 2021/346* (2013.01)

(58) Field of Classification Search
CPC ........ B60R 21/00; B60R 21/34; B60R 21/36; B60R 2021/0004; B60R 2021/343; B60R 2021/346
See application file for complete search history.

(56) References Cited

U.S. PATENT DOCUMENTS

| 6,460,909 | B2 * | 10/2002 | Mansoor et al. ............. 293/120 |
|---|---|---|---|
| 6,920,954 | B2 | 7/2005 | Hashimoto et al. |
| 6,950,014 | B2 | 9/2005 | Rao et al. |
| 7,158,017 | B2 | 1/2007 | Baur et al. |
| 7,174,985 | B2 | 2/2007 | Sawa et al. |
| 8,172,027 | B2 | 5/2012 | Mishra |
| 8,447,474 | B2 | 5/2013 | Breed |
| 8,594,370 | B2 | 11/2013 | Schamp et al. |
| 8,622,463 | B2 * | 1/2014 | Schaefer .................. 296/187.04 |
| 2009/0102167 | A1 * | 4/2009 | Kitte et al. ................. 280/728.2 |
| 2012/0161473 | A1 * | 6/2012 | Schaefer .................. 296/187.09 |
| 2012/0267183 | A1 * | 10/2012 | Wilmot et al. ................ 180/271 |
| 2013/0119681 | A1 * | 5/2013 | Mendis et al. ................ 293/107 |

FOREIGN PATENT DOCUMENTS

JP           2009012587 A     1/2009

* cited by examiner

*Primary Examiner* — Drew Brown
(74) *Attorney, Agent, or Firm* — Frank A. MacKenzie; Bejin Bieneman PLC

(57) ABSTRACT

A vehicle front end assembly includes a radiator assembly, a fascia component overlapping the radiator assembly, and a grill laterally aligned with the radiator assembly. The grill and radiator assembly define an airflow space longitudinally therebetween. The vehicle front end assembly further includes an airbag coupled between the fascia component and the radiator assembly, and the airbag is disposed outside of the airflow space in both deflated and inflated configurations.

20 Claims, 4 Drawing Sheets

VEHICLE FRONT END AIRBAG ASSEMBLY AND SYSTEM

BACKGROUND

Vehicles, such as automobiles, may have varying performance goals based on different potential impact modes. For example, the stiffness at the front end of a vehicle may be relatively high for the purposes of managing relatively high impact forces, e.g. from a high speed impact with another vehicle, while that stiffness may exceed design thresholds for other impact modes, e.g. a collision with a pedestrian. It is currently difficult to provide overall vehicle stiffness together with selective accommodation for lower stiffness thresholds for, e.g., pedestrian protection, all within current vehicle architectures and styles, e.g., such as low-slung and shorter overhang front end. Furthermore, plastic and/or composite parts designed for pedestrian leg impact protection may have undesirable manufacturing and/or material process control variations.

DRAWINGS

FIGS. 1A-B are, respectively, partial perspective and side cross-sectional views of an exemplary front end of a vehicle, including an exemplary airbag apparatus in a deflated state.

FIGS. 2A-B are, respectively, partial perspective and side cross-sectional views of an exemplary front end of a vehicle, including an exemplary airbag apparatus in an inflated state.

DETAILED DESCRIPTION

Figure 1A:
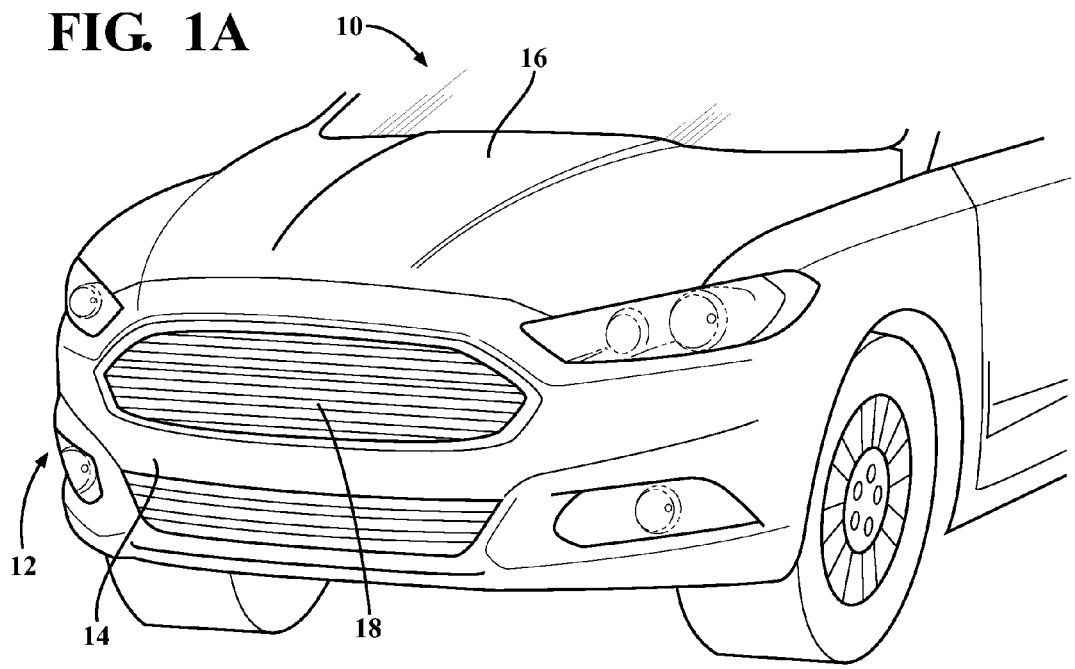
Figure 1B:
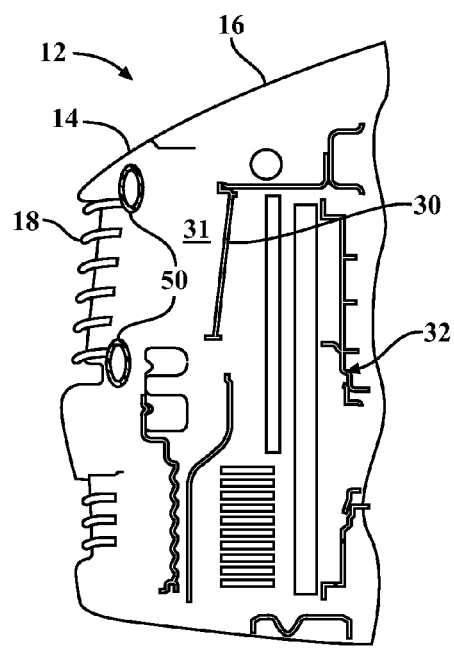

FIGS. 1A-B are exemplary illustrations of a vehicle 10 with a front end 12. The front end 12 includes a front fascia component 14, a hood 16, and a grill 18. These components of the front end 12 of the vehicle 10 substantially cover or overlap with a radiator apparatus 30 for the vehicle 10. The grill 18 and the radiator apparatus 30 are laterally aligned in a substantially parallel configuration with an airflow space 31, i.e. grill opening, defined therebetween. As is known in the art, external air may pass through the grill 18 and the space 31 to the radiator apparatus 30, to be utilized by the vehicle 10, e.g. by the engine cooling systems. The radiator apparatus 30 is secured to a support structure 32 of the vehicle 10, and the support structure 32 may include frame and/or sub-frame components. The radiator apparatus 30 and support structure 32 may comprise a radiator assembly.

Figure 2A:
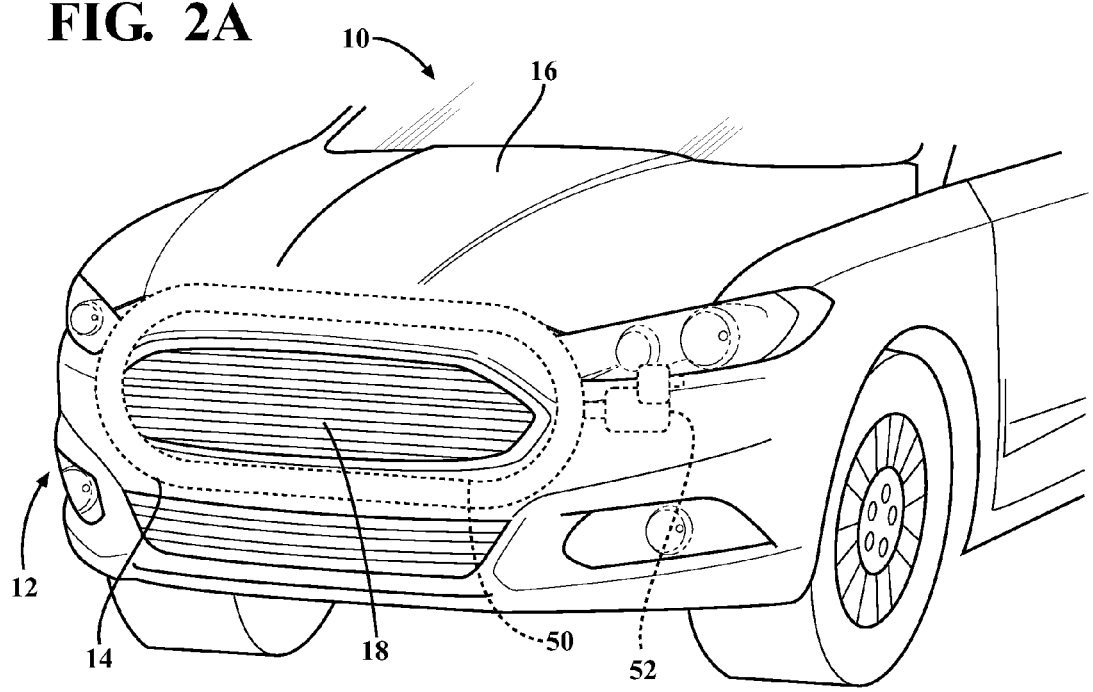
FIG. 2C is a side cross-sectional view of another exemplary front end of a vehicle, including an exemplary airbag apparatus in an inflated state.
Figure 2B:
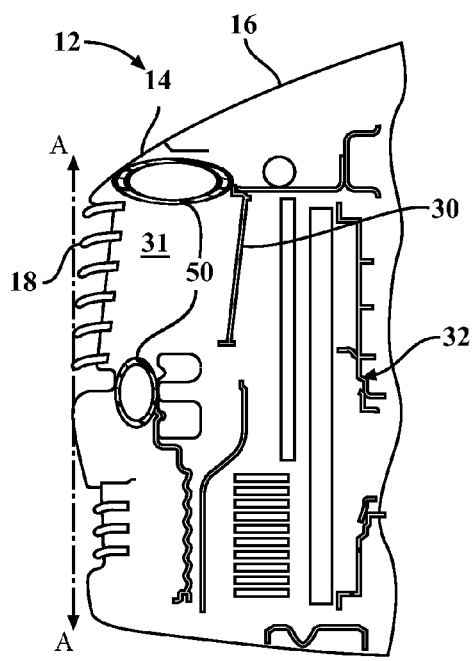

With additional reference to FIGS. 2A-B, the vehicle 10 includes an airbag 50 disposed within the front end 12 between the front fascia component 14 and the radiator apparatus 30. The airbag 50 is coupled to an operating assembly 52 for selectively inflating and/or deflating the airbag 50. The airbag 50 has an overall toroid configuration with, e.g., a curved, circular or oval, cross-sectional shape. The airbag 50 may include standard coated airbag fabric, synthetic rubber and/or similar elastomeric materials.

In both the deflated configuration of FIG. 1B, and the inflated configuration of 2B, the airbag 50 extends substantially around the space 31 between the grill 18 and the radiator apparatus 30. According to the principles of the present invention, the airbag 50—whether deflated or inflated—may remain substantially free of the grill opening or space 31 and, therefore, have substantially no effect on the thermal performance of the vehicle 10. It should be understood that an airbag between the front fascia component and the radiator apparatus according to the principles of the present disclosure may have a variety of shapes, segments, and/or configurations depending on the grill and radiator designs of the particular vehicle.

With particular reference to FIG. 2B, in one implementation, the inflated airbag 50 extends between an inner surface of the front fascia component 14 and respective portions of the radiator apparatus 30 and the support structure 32. In this implementation, all of the other components of the front end 12 of the vehicle 10 remain relatively fixed. With the airbag 50 inflated, the front end 12 of the vehicle 10 offers an energy absorbing system during impact events with relatively low impact forces, e.g. a pedestrian impact at a vehicle speed of 50 kilometers per hour or less. For example, on one hand, in a vehicle without an apparatus such as airbag 50, such a vehicle may have a substantially rigid response to a pedestrian impact. According to the principles of the present disclosure, the inflated airbag 50 provides energy absorption between the front of the vehicle 10 and the relatively rigid frame, towards mitigating the impact of relatively low impact forces, e.g. forces in a pedestrian impact.

Moreover, as the airbag 50 extends substantially around—above and below—the grill opening or space 31, the inflated airbag 50 provides impact energy absorbing benefit in regions of the front end 12 corresponding to the areas of interest for mitigating vehicle impacts with upper and lower legs of pedestrians.

Figure 2C:
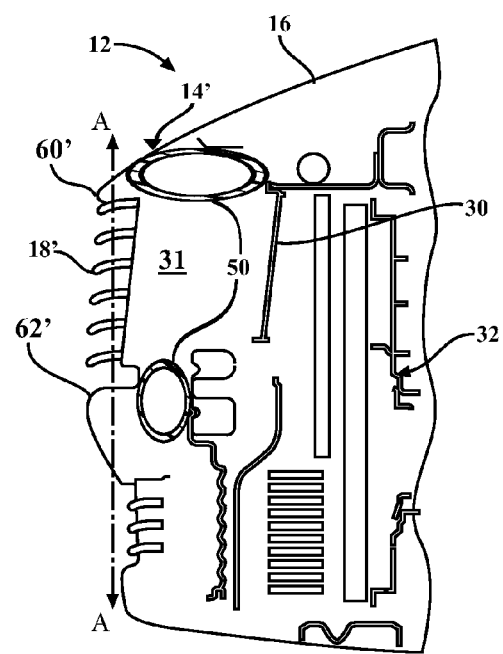

Referring to FIG. 2C, in one implementation, the vehicle 10 includes a front fascia component 14' having first and second movable segments 60' and 62' adjacent a movable grill 18'. Upon inflation of the airbag 50, the grill 18' and the movable segments 60' and 62' move longitudinally forward, as shown relative to the reference line A-A. As these component move in the longitudinal direction, the inflated airbag 50 remains substantially free of the grill opening or space 31. It should be understood that, otherwise, the descriptions herein of the front fascia component 14 and the grill 18 equally apply to the front fascia component 14' and the grill 18'.

The vehicle 10 includes a vehicle computer 68 (FIGS. 3-4) in communication with the operating assembly 52 for the airbag 50, and the computer 68 generally includes a processor and a memory. The memory including one or more forms of computer-readable media and stores instructions executable by the processor for performing various operations, including as disclosed herein. Further, the computer 68 may include more than one computing device, e.g., controllers or the like included in the vehicle 10 for monitoring and/or controlling various vehicle components, e.g., an engine control unit (ECU), transmission control unit (TCU), etc. The computer 68 is generally configured for communications on a controller area network (CAN) bus or the like. The computer 68 may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc., including, e.g., the operating assembly 52 for the airbag 50 and the speedometer (not shown). Alternatively or additionally, in cases where the computer actually comprises multiple devices, the CAN bus or the like may be used for communications between the multiple devices that comprise the vehicle computer 68. In addition, the computer may be configured for communicating with a network, which may include various wired and/or wireless networking technologies, e.g., cellular, Bluetooth, wired and/or wireless packet networks, etc.

Figure 3:
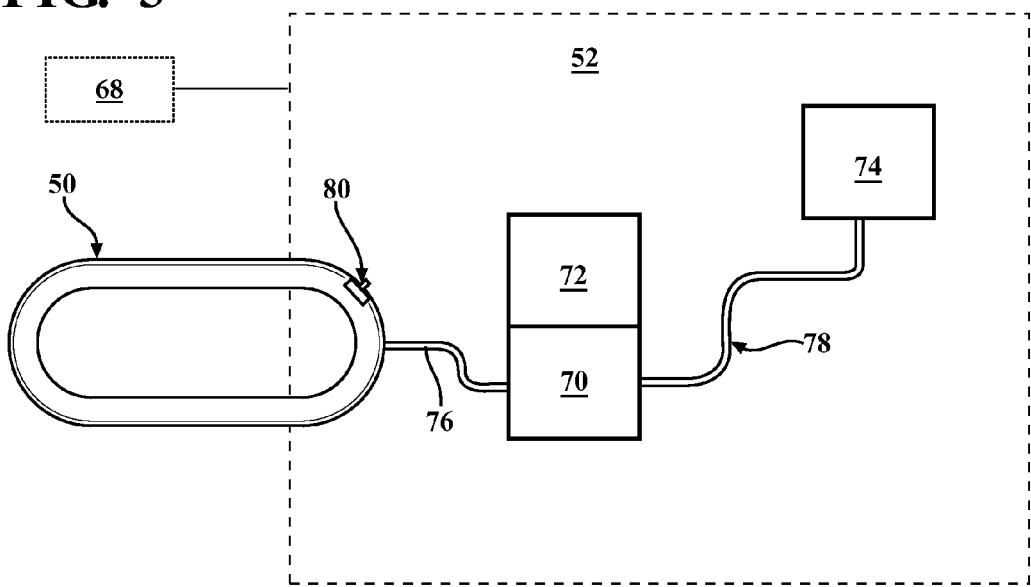
FIG. 3 is a schematic diagram of an exemplary airbag and operating assembly system.

With additional reference to FIG. 3, the operating assembly 52 for the airbag 50 includes a control valve 70, a valve actuator 72, and a compressor and pump mechanism 74. The airbag 50 and the control valve 70 are fluidly coupled with a first tube 76, and the control valve 70 and the compressor and pump mechanism 74 are fluidly coupled with a second tube 78. The operating assembly 52 may further include an outlet 80 fluidly coupled to the airbag 50 separate from the first tube 76. The computer 68 of the vehicle 10 may communicate with and/or control the operating assembly 52 to selectively operate the compressor and pump mechanism 74 and the actuator 72 to open the control valve 70 to inflate the airbag 50. The computer 68 of the vehicle 10 may communicate with and/or control the operating assembly 52 to selectively operate the outlet 80 and/or the actuator 72 to open the control valve 70 to deflate the airbag 50.

Figure 4:
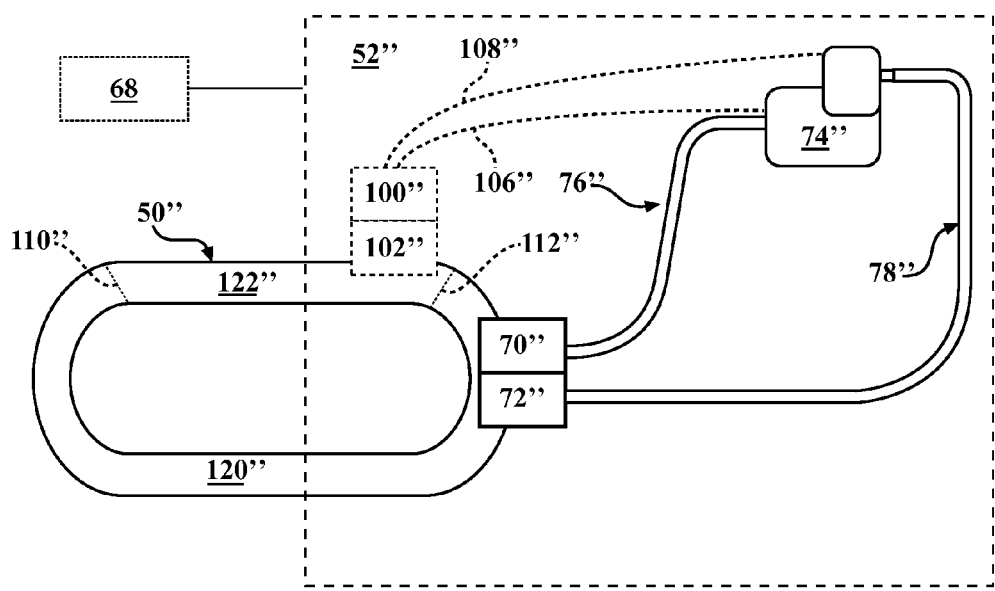
FIG. 4 is a schematic diagram of another exemplary airbag and operating assembly system.

With reference to FIG. 4, in another implementation, an operating assembly 52" for an airbag 50" includes a first control valve 70" and a first valve actuator 72" directly coupled to the airbag 50", and a compressor and pump mechanism 74" fluidly coupled to the control valve 70" and the valve actuator 72" with a first pair of tubes 76", 78" as supply and return lines to the control valve 70", respectively.

Additionally, in some implementations, the airbag 50" is fluidly partitioned or otherwise segmented, and the operating assembly 52" includes a second control valve 100" and a second valve actuator 102" coupled to the compressor and pump mechanism 74" with a second pair of tubes 106", 108". The airbag 50" may include first and second partitions 110", 112" defining first and second fluidly-independent segments 120", 122". The first control valve" is coupled to the first segment 120" and the second control valve 100" is coupled to the second segment 122". According to the principles of the present disclosure, the first and second segments 120" and 122" may be distinctly controlled by the computer 68 and the operating assembly 52", e.g. inflated to different pressures depending on the design of the vehicle 10 and/or sensed operating conditions thereof. Moreover, the first and second segments 120", 122" may have a variety of configurations, such as being detached from one another. Additionally, it should be understood that the number of segments illustrated in FIG. 4 is exemplary, and that an airbag according to the principles of the present disclosure may have yet additional segments in a variety of configurations, together with complementary components of the associated operating assembly.

Figure 5:
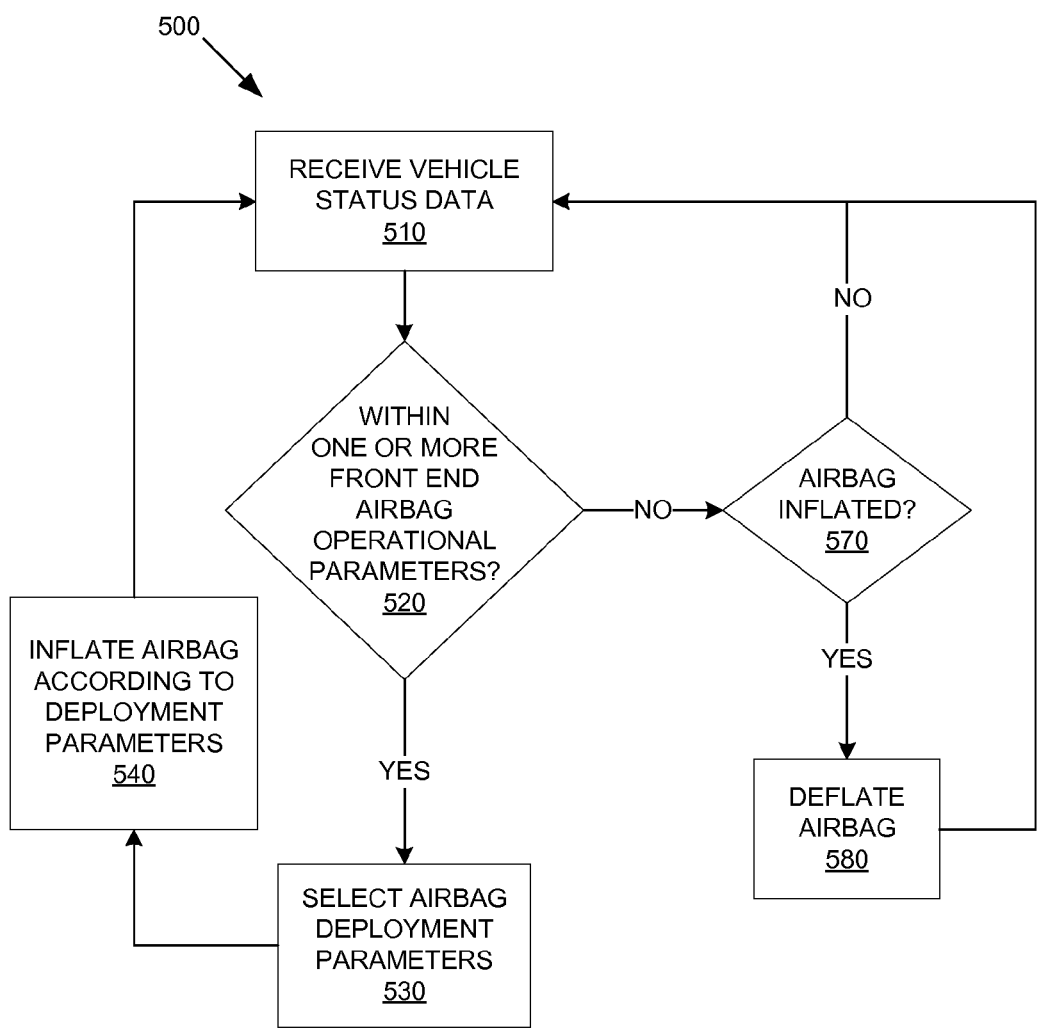
FIG. 5 illustrates an exemplary process for utilizing a front-end airbag according to the principles of the present disclosure.

Referring to FIG. 5, an exemplary process 500 for deploying and utilizing airbag 50 is illustrated. The process 500 may commence when the vehicle 10 is powered on or as otherwise determined and controlled by the computer 68, and the process 500 may end when the vehicle 10 is powered off or as otherwise determined and controlled by the computer 68. At a block 510, the process 500 begins with the computer 68 of the vehicle 10 receiving status information from the sensing systems. For example, the computer 68 of the vehicle 10 may receive current speed information for the vehicle 10. Next, at a block 520, the computer 68 determines whether the status of vehicle 10 is within one or more operational threshold parameters of the airbag 50. For example, if it is desired to deploy the airbag 50 at relatively low speeds for mitigation of potential pedestrian impact events, an operational threshold may be defined as the current speed being at or below 50 kilometers per hour. If the status is within a threshold, e.g. the speed is at or below 50 kilometers per hour, the process 500 continues to a block 530, where the computer 68 for the vehicle 10 selects deployment parameters for the airbag 50. For example, based on the size of the airbag 50, the design of the front end 12 of the vehicle 10, and the current status of the vehicle, e.g. speed, the pressure to which the airbag 50 is inflated may be optimized. Next, at a block 540, the airbag 50 is inflated, per the parameters determined at the block 530. With the airbag 50 inflated, the process 500 continues back to block 510 and the vehicle status information is updated. If, at the block 520, the status of vehicle 10 remains within one or more operational threshold parameters of the airbag 50, the process 500 then continues in a loop.

If, at the block 520, the computer 68 of the vehicle 10 determines that the vehicle status is not within operational threshold parameters for the airbag 50, then, at a block 570, the computer 68 of the vehicle determines whether or not the airbag 50 has been inflated. If so, at a block 580, the airbag 50 is deflated. If the airbag 50 had not been inflated or following deflation of the airbag 50, the process 500 returns to the block 510.

It should be understood that the process 500 is exemplary. Additional operational thresholds that may be used to deploy the airbag 50 may include whether or not the vehicle is on, or in gear. Thresholds may also be used in combination, e.g. whether the vehicle is on and the vehicle speed. The process 500 may include additional features, e.g., if the airbag 50 is to be deployed when the vehicle is on, the process 500 may include monitoring and maintaining of the desired pressure of the airbag 50 over time—including, if a combination of thresholds is used, where the desired pressure of the airbag 50 changes, e.g. with vehicle speed.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:
1. A vehicle front end assembly comprising:
  a radiator assembly;
  a fascia component overlapping the radiator assembly;

a grill laterally aligned with the radiator assembly, the grill and radiator assembly defining an airflow space longitudinally therebetween; and an airbag coupled between the fascia component and the radiator assembly, the airbag disposed outside of the airflow space and around the grill in both deflated and inflated configurations.

2. The assembly of claim 1, wherein the airbag has a closed shape defining a void.

3. The assembly of claim 2, wherein the airbag has a toroid shape.

4. The assembly of claim 3, wherein the airbag includes at least one of fabric and elastomeric materials.

5. The assembly of claim 1, wherein the airbag extends above and below the airflow space.

6. The assembly of claim 5, wherein the airbag extends around the airflow space.

7. The assembly of claim 1, wherein the airbag includes at least two segments fluidly partitioned from each other.

8. The assembly of claim 7, wherein the at least two segments are detached from one another.

9. The assembly of claim 1, wherein the fascia component has at least one movable portion that the airbag displaces longitudinally forward in the inflated configuration.

10. The assembly of claim 9, wherein the airbag displaces the grill longitudinally forward in the inflated configuration.

11. A system, comprising:
a grill and radiator assembly for a passenger vehicle, the grill and radiator assembly having an airflow space therebetween;

a fascia component at least partially overlapping the radiator assembly;

an airbag coupled between the fascia component and the radiator assembly, the airbag disposed outside of the airflow space and around the grill in both deflated and inflated configurations; and an operating assembly fluidly coupled to the airbag.

12. The system of claim 11, further comprising a computer in communication with the operating assembly.

13. The system of claim 12, wherein the computer determines that vehicle is within at least one operating threshold parameter for the airbag and instructs the operating assembly to inflate the airbag.

14. The system of claim 13, wherein the at least one operating threshold parameter is a vehicle speed.

15. The system of claim 12, wherein the computer determines that vehicle is within a plurality of operating threshold parameters for the airbag and instructs the operating assembly to inflate the airbag.

16. The system of claim 11, wherein the airbag extends above and below the airflow space.

17. The system of claim 16, wherein the airbag extends around the airflow space.

18. The system of claim 16, wherein the airbag has a toroid shape around the airflow space.

19. The system of claim 11, wherein the airbag includes at least two segments fluidly partitioned from each other.

20. The system of claim 19, wherein the operating assembly is independently coupled to the at least two segments.

* * * * *